United States Patent [19]

Feiner

[11] 4,219,701
[45] Aug. 26, 1980

[54] TONE GENERATING HOLD IMPEDANCE CIRCUIT FOR KEY TELEPHONE LINE CIRCUITS

[75] Inventor: Alexander Feiner, Rumson, N.J.

[73] Assignee: Bell Telephone Laboratories, Incorporated, Murray Hill, N.J.

[21] Appl. No.: 944,349

[22] Filed: Sep. 21, 1978

Related U.S. Application Data

[63] Continuation-in-part of Ser. No. 846,144, Oct. 27, 1977, Pat. No. 4,149,042.

[51] Int. Cl.² ............................................. H04M 1/72
[52] U.S. Cl. ............................ 179/99 H; 179/99 LC
[58] Field of Search ................. 179/1 B, 2.5 R, 2.5 B, 179/81 R, 99

[56] References Cited

U.S. PATENT DOCUMENTS

| | | | |
|---|---|---|---|
| 3,246,082 | 4/1966 | Levy | 179/1 B |
| 3,400,221 | 9/1968 | Wolters | 179/2.5 R |
| 3,794,774 | 2/1974 | Kemmerly et al. | 179/81 R |
| 3,895,192 | 7/1975 | Angner et al. | 179/99 |
| 3,925,625 | 12/1975 | Angner et al. | 179/99 |
| 3,965,308 | 7/1976 | Jones et al. | 179/99 |
| 4,013,840 | 3/1977 | Anderson | 179/2.5 R |
| 4,056,695 | 11/1977 | Angner et al. | 179/99 |
| 4,066,847 | 1/1978 | Giordano | 179/99 |
| 4,090,038 | 5/1978 | Biggs | 179/99 |
| 4,149,042 | 4/1979 | Balzer et al. | 179/99 |

*Primary Examiner*—James W. Moffitt
*Assistant Examiner*—Randall P. Myers
*Attorney, Agent, or Firm*—John A. Caccuro

[57] ABSTRACT

A two-terminal tone generating hold impedance is disclosed which is powered from a central office telephone line and provides the functions of a hold impedance in a key telephone line circuit while providing an audio tone signal to an associated telephone line when the line is placed in a hold condition. The tone generating hold impedance consists of an oscillator circuit which is self-exciting upon the application of a dc voltage resulting from the connection of the tone generating hold impedance to the telephone line. In another embodiment a line powered music receiver functions as a hold impedance and applies music, received via radio or cable transmission, to the line placed in a hold condition.

17 Claims, 12 Drawing Figures

MUSIC TRANSMITTER (MT1)

MUSIC RECEIVER (MR1)

TONE GENERATING HOLD IMPEDANCE CIRCUIT FOR KEY TELEPHONE LINE CIRCUITS

CROSS REFERENCE TO RELATED APPLICATIONS

This application is a continuation-in-part of copending U.S. patent application for a "Modulated RF Carrier Distributing Arrangement for Key Telephone Line Circuits" Ser. No. 846,144, filed Oct. 27, 1977 which is now U.S. Pat. No. 4,149,042 having a common assignee.

TECHNICAL FIELD

This invention relates to a circuit for providing tone or music signals to a key telephone line which is in the hold condition.

BACKGROUND ART

When a communication path is established between a calling and called party, if one of the parties to the call is associated with a key telephone system, it is possible for the key telephone party to place the call in the hold mode. In this mode the communication path between the parties is maintained active but communications cannot take place. The key telephone party can, by operation of the line key, return the call to the bidirectional communication state.

In some situations it may be desirable to provide some form of entertainment, usually music, to the party placed on hold. In other situations it may be more desirable to provide a pleasing tone or combination of tones to the party placed on hold.

It is desirable, for economic reasons, to use the same line circuit to serve all stations whether or not a tone or music-on-hold feature is provided. Such a system is described in U.S. Pat. No. 4,056,695 issued to Angner et al on Nov. 1, 1977. However, the system described in the above-mentioned circuit while constituting an improvement over prior art requires rewiring of the line card to accommodate the connection of a connectorized daughter-board music receiver card to the line card. In certain applications spare terminals on the line card are not available to wire-in the music signal and hence a separately mounted tone or music coupler card is required thereby resulting in additional space allocation, additional wiring and duplication of hold control logic on the music receiver card. In addition, the existing tone and music coupler cards use passive components which exhibit limited isolation between telephone lines sharing a common music source and could also exhibit signal loading problems when too many lines share a common tone or music source.

In copending parent U.S. patent application for a "Modulated RF Carrier Distributing Arrangement for Key Telephone Line Circuits" Ser. No. 846,144 filed Oct. 27, 1977 which is now U.S. Pat. No. 4,149,042, a modulated RF carrier distributing arrangement is disclosed which will provide a music-on-hold feature for the key telephone unit (KTU) line circuits of the type described by U.S. Pat. No. 4,056,695. The system consists of a centralized music transmitter unit and optional connectorized music receiver cards which are connected to each line card requiring a music-on-hold feature. Signal communication between the common transmitter and the music receiver cards is accomplished using the existing common dc power wiring to each line card. The music transmitter unit frequency modulates an internally generated RF carrier with a customer provided music signal. The frequency modulated (FM) signal is then applied to a common dc power supply lead and distributed to the line cards. The music receiver is constructed as a connectorized daughter-board which mates with the existing option connector on the line card. The existing option connector has dc power and ground voltages available in addition to leads connected across the existing hold impedance. The music receiver obtains dc power as well as the FM signal over the power lead and then demodulates the received signal which is then applied directly across the hold impedance of the line card.

In the pending patent application of Biggs Ser. No. 846,144 filed on July 14, 1977 which is now U.S. Pat. No. 4,090,038, a tone-on-hold circuit is disclosed which utilizes light coupled transistors to couple a common digital signal source to several telephone lines on hold. The Biggs' application while offering excellent isolation between the lines does not teach a self-contained line powered tone circuit which functions as both a line hold impedance and a tone source.

Thus, in the existing art the application of an audio tone or music to a telephone line in the hold state is usually accomplished by adding circuitry across an existing hold impedance, this circuitry requiring connection to the line circuit power supply and a common external tone or music source.

SUMMARY OF THE INVENTION

The foregoing problems are solved and a technical advance achieved by providing a two-terminal central office line powered tone generating hold impedance which provides the functions of a hold impedance and a tone source. An oscillator circuit is connected between the two terminals and is self exciting from the dc voltages resulting when connected across the central office line to provide an audio tone signal while maintaining dc current flow to sustain a hold condition on the central office line. The two-terminal tone generator circuit could be implemented as a hybrid or integrated circuit which replaces the hold impedance of existing key telephone line units (KTU) resulting in a tone-on-hold capability. The disclosed tone generating hold impedance can be implemented on an option card as described in U.S. Pat. No. 4,056,695. The tone generating hold impedance can be implemented to provide a constant tone output, an interrupted tone output, or an output that alternates between two different tones.

When a music-on-hold capability is desired, one embodiment of the instant disclosure provides for a two-terminal central office line powered music receiver which functions jointly as a hold impedance and music coupler circuit. The music signal in such an arrangement may be received either via radio or cable transmission as described in the parent application Ser. No. 846,144 filed on Oct. 27, 1977 by Balzer et al which is now U.S. Pat. No. 4,149,042.

BRIEF DESCRIPTION OF THE DRAWINGS

The purpose and operation of the present invention, as well as additional objectives, advantages and features thereof, will be more fully appreciated from the illustrative embodiment shown in the drawing in which.

DETAILED DESCRIPTION

General Operation

Figure 1:
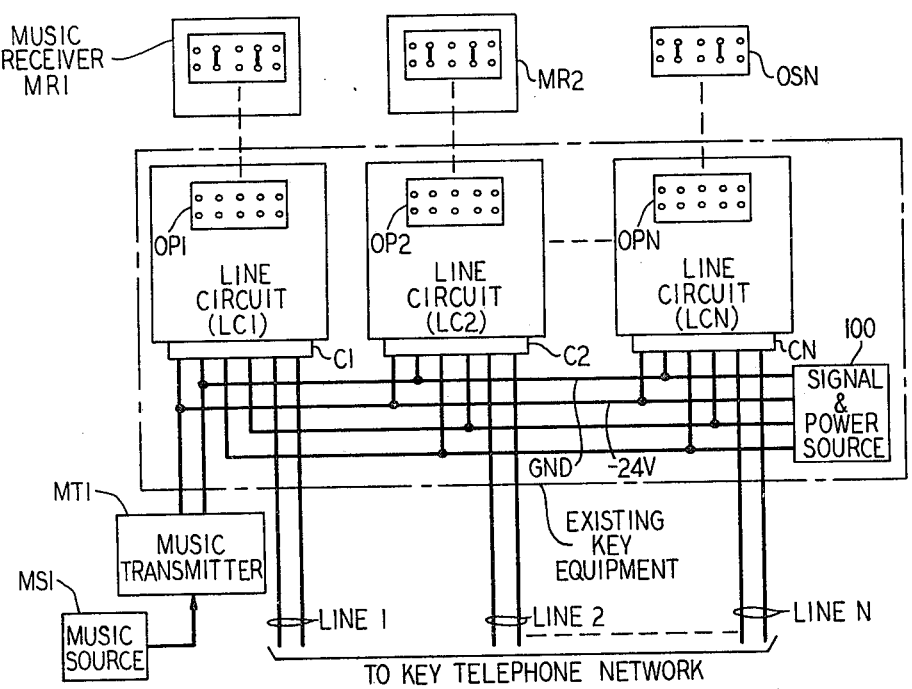
FIG. 1 shows a typical application of the invention for providing music-on-hold to multiple key telephone line circuits.
Figure 2:
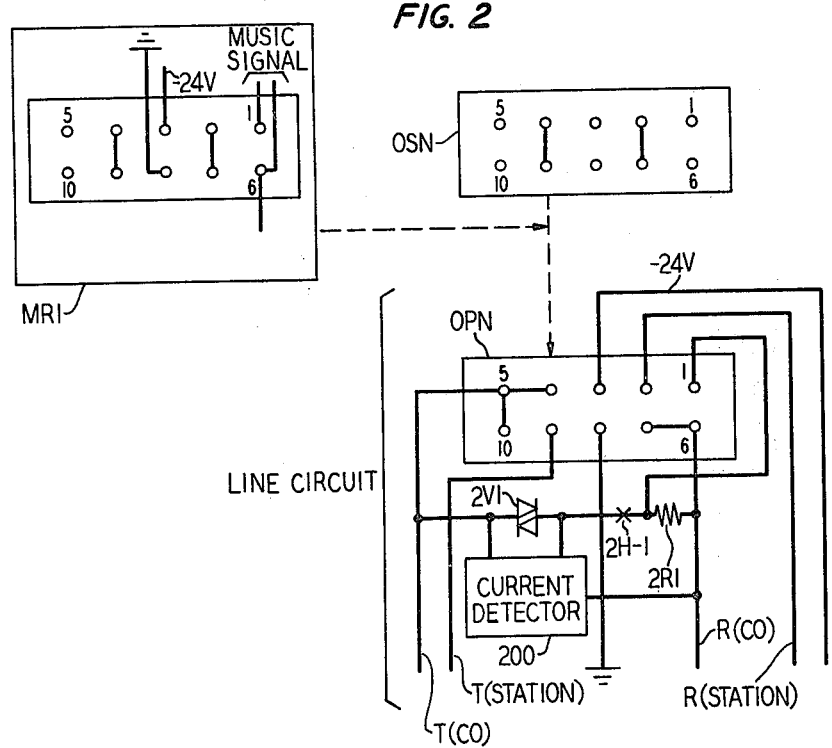
FIG. 2 shows the wiring of the existing option plug (OPN) and option socket (OSN) as well as the wiring of the music receiver (MR1) card.

Shown in FIG. 1 is a typical application of the modulated RF carrier distributing arrangement for providing music-on-hold to key telephone line circuits. The description of operation of station sets and line circuits together with a CO or PBX is well known in the telephone art, for example, see U.S. Pat. No. 3,436,488 issued to R. E. Barbato et al on Apr. 1, 1969. The operation of the line circuits LC1–LCN is described in U.S. Pat. No. 4,057,693 issued to Angner et al on Nov. 8, 1977, which is incorporated herein by reference. The identical line circuits, LC1–LCN of FIG. 1, are plug-in connectable to connectors C1–CN which are wired to the signal and power unit 100 and the associated key telephone network. In key telephone applications not requiring a music-on-hold feature each line circuit, such as line circuit LCN, would be equipped with an option socket, such as option socket OSN, plugged into the option plug, such as option plug OPN, to provide the proper cross-connection of signal leads. As shown in FIG. 2, option socket OSN interconnects telephone leads R (station) and T (station) to R (CO) and T (CO) respectively. This arrangement is more fully detailed in previously mentioned U.S. Pat. No. 4,056,695.

Returning to FIG. 1, a music-on-hold feature is provided in the disclosed system by providing music transmitter circuit MT1 which superimposes across the common −24 v power and ground bus an RF carrier which is FM modulated with a music signal provided by music source MS1. This modulated carrier signal is available on the −24 v power lead at each line circuit LC1–LCN. Since the −24 v and ground leads are available on the option plug of each line circuit (as shown in FIG. 2), the FM signal is distributed to each music receiver card, such as music receiver card MR1 via the option plug.

As shown in FIG. 2, to equip a line circuit with the music-on-hold capability option socket OSN is removed and music receiver card MR1 is merely plugged-in at each line circuit location (LC1 and LC2 in the example of FIG. 1) requiring a music-on-hold capability.

Figure 5:
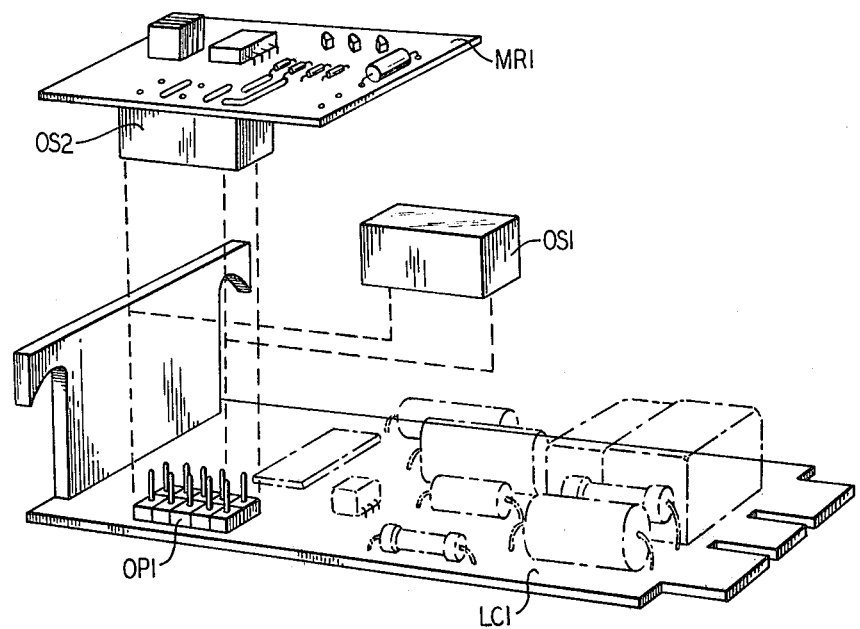
FIGS. 5 and 6 show perspective views of the line circuit (LC1), option socket (OS1) and the music receiver (MR1) card.

FIG. 5 illustrates how music receiver card MR1 plugs into a line card. The music receiver card MR1 derives power and RF signals from the −24 v and ground leads. Once the FM signal is separated from the −24 v dc voltage it is demodulated, amplified and the resulting music signal is connected across pins 1 and 6 of the option socket.

As shown in FIG. 2, pins 1 and 6 of the option plug (OPN) are wired across hold resistance 2R1 of the associated line circuit. Hence, the music signal is constantly applied across hold resistor 2R1 and will be applied to tip T (CO) and ring R (CO) leads of the central office (CO) pair whenever relay contact 2H-1 is closed. Relay contact 2H-1 closes when the line circuit hold relay (not shown) is operated in response to a signal from shunt current detector 200 when a hold condition is requested by the telephone user. The operation of shunt detector 200 is described in U.S. Pat. No. 4,057,693 issued to Angner et al. Thus, as shown in FIG. 2, during the hold condition the music signal proceeds from music receiver MR1 to pin 6 and hence to lead R (CO) via pin 6 of OPN. The other terminal of the music receiver connects to pin 1 of the MR1 and hence through pin 1 of OPN to the junction of resistor 2R1 and make contact 2H-1. Since the telephone line is in the hold condition, make contact 2H-1 is shorted and hence the music signal is supplied via varistor 2V1 to lead T (CO). The music signal, being across leads R (CO) and T (CO), is connected through the CO to the party on hold. Then the hold condition is released, relay contact 2H-1 prevents music signals from being applied across leads T (CO) and R (CO).

Music Transmitter

Figure 3:
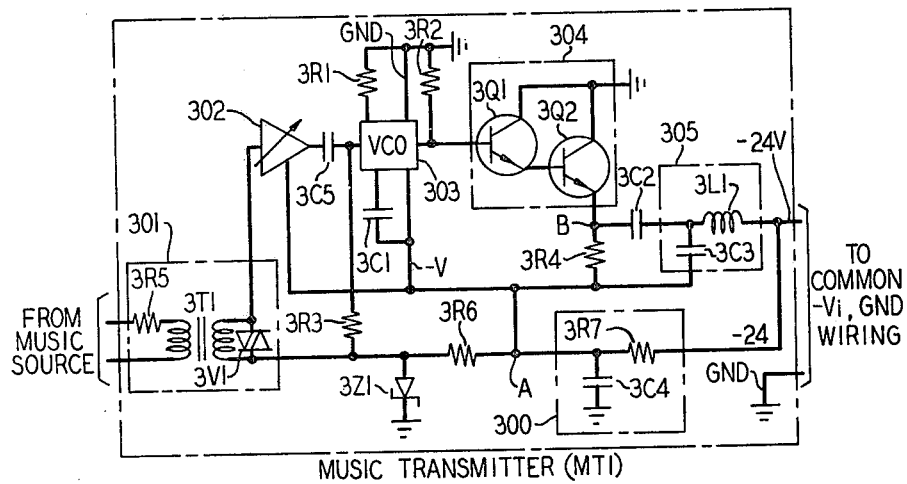
FIG. 3 shows a schematic of the music transmitter circuit.

Music transmitter MT1 shown in FIG. 3 is merely illustrative of circuits known in the art which will perform adequately as a modulated music transmitter. A frequency modulated (FM) mode of operation is used, rather than amplitude modulation (AM), to reduce the effects of noise and signal attenuation of the quality of the distributed music signals. An FM signal is also less likely to produce audible interference with normal telephone operation.

As shown in FIG. 3, the output of music transmitter MT1 is connected across the −24 v and ground voltage leads. The −24 volt and ground voltage leads are common to all the key telephone line circuits as shown in FIG. 1. The dc power filter 300 of FIG. 3, comprised of resistor 3R7 and capacitor 3C4, filters any noise or music signals on the −24 volt supply. The resultant dc voltage at node A is used to bias amplifier 302, voltage controlled oscillator (VCO) 303, amplifier 304 as well as provide a reference voltage for VCO 303 through the resistor 3R6 and zener diode 3Z1. Music source MS1, shown in FIG. 1, supplies the music signal which is connected via coupler 301, of FIG. 3, to music transmitter MT1. Coupler 301 is comprised of resistor 3R5, transformer 3T1 and varistor 3V1. Transformer 3T1 provides isolation and varistor 3V1 limits and protects music transmitter MT1 from any over voltage signals or surges. Amplifier 302 provides adjustable voltage gain to set the proper level of music signal into VCO 303. The output signal from amplifier 302 is coupled via capacitor 3C5 to the input of VCO 303. Resistor 3R3 provides a reference dc bias voltage to the input of VCO 303. Voltage controlled oscillator 303 is a device whose frequency of oscillation is dependent upon input volage deviation about a fixed reference dc voltage. Many integrated circuits are commercially available which would provide the VCO function, the Signetics NE566 function generator is typical of circuits commonly available. A more detailed description of the operation of a function generator is available in the Signetics digital, linear MOS applications handbook, 1974 edition.

The frequency of oscillation ($f_o$) of VCO 303 is inversely proportional to the product of an external resistor ($R_f$) 3R1 and capacitor ($C_f$) 3C1 as described by the formula $$f_o \approx \frac{1}{KR_fC_f} \qquad (1)$$

where K is a constant determined from VCO bias conditions. The frequency of operation of VCO 303 is chosen to minimize RF radiation and interference and yet result in a reasonable RF impedance to ground across the −24 volt supply. Thus, adequate RF voltage can be developed across this relatively low RF impedance with a simple driving circuit. The output of VCO 303 is connected to a low output impedance line driver amplifier (304).

As illustrated in FIG. 3 output amplifier 304 is comprised of two transistors 3Q1 and 3Q2 connected as a Darlington-pair. Resistor 3R2 provides bias voltage to the base of transistor 3Q1 and resistor 3R4 provides bias to the emitter of transistor 3Q2. The Darlington-pair, transistors 3Q1 and 3Q2, provide a low output impedance at node B to drive the low RF impedance −24 v line. Capacitor 3C2 couples signals from the emitter of transistor 3Q2 to impedance matching network 305 which is comprised of capacitor 3C3 to ground and inductor 3L1 in series with the −24 volt line.

As mentioned previously, the function blocks 300, 301, 302, 303, 304 and 305 are merely illustrative and many variations of each circuit are well known in the art which will adequately provide these functions.

Music Receiver

Figure 4:
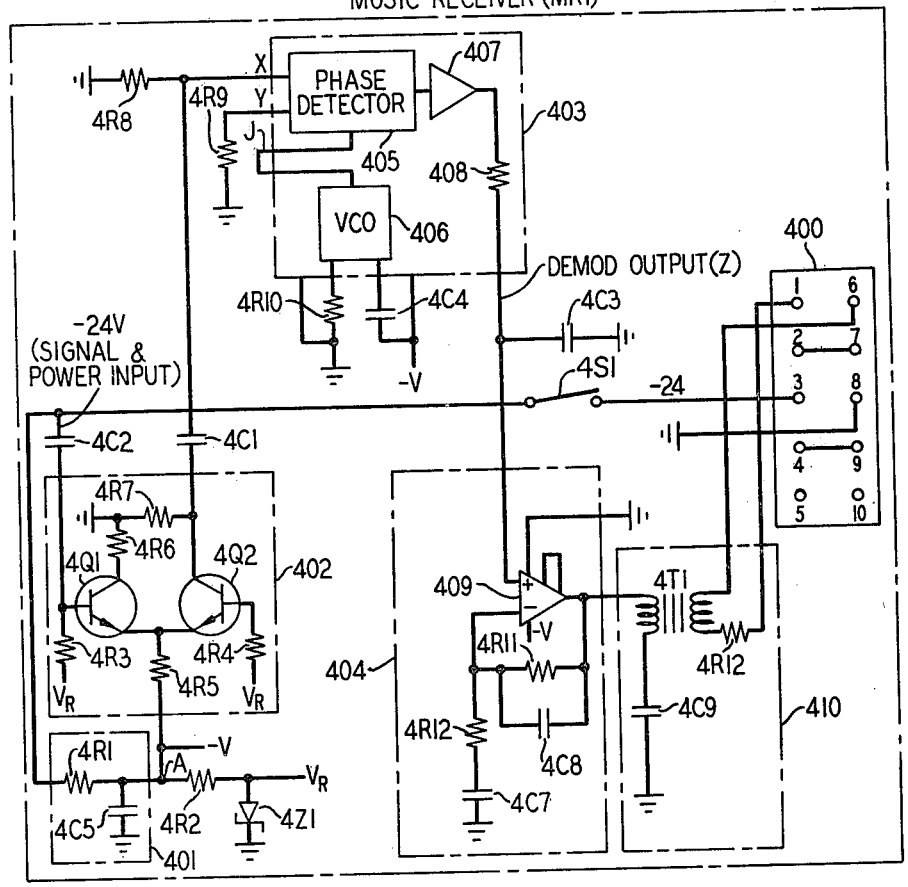
FIG. 4 shows a schematic of the music receiver circuit.
Figure 6:
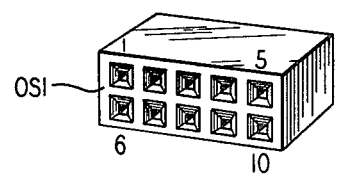

Music receiver MR1, as shown in FIG. 4, utilizes a conventional phase-locked loop arrangement for demodulation of the FM signal. As shown in FIG. 5, and as discussed above music receiver MR1 is constructed as an optional connectorized daughter-board which mates with the existing option plug OP1 of line card LC1. When no music-on-hold feature is required, option socket OS1, shown in FIG. 6, is connected to line card LC1 as shown in FIG. 5. When a music-on-hold feature is desired, option socket OS1 is removed and music receiver MR1 is connected to option plug OP1. Note, from FIG. 2 that the addition of switch 4S1 in series with the −24 v lead could be used to disable the music signal and hence enable music receiver MR1 to also function as option socket OSN.

Referring again to FIG. 4, option socket 400 is wired to mate with option plug OPN of FIG. 2 with pin 2 connected to pin 7 and pin 4 connected to pin 9. In addition, pin 8 is connected as the ground terminal and pin 3 as the −24 volt terminal. The output of music receiver MR1 is connected across pins 1 and 6 of option socket 400. The −24 volt dc is separated from the FM signal by power filter 401 which includes series resistor 4R1 and capacitor 4C5 to ground. The resulting dc voltage −V at node A is used to bias differential amplifier 402, phase locked loop 403 and output amplifier 404. Reference voltage VR, derived from node A using resistor 4R2 and zener diode 4Z1, is used to bias differential amplifier 402.

The music signal appearing on the −24 volt dc lead from common music transmitter MT1 is coupled, via capacitor 4C2, to differential amplifier 402 comprised of transistors 4Q1, 4Q2 and associated bias resistors 4R3 through 4R7. Differential amplifier 402 is biased at reference voltage VR and has enough gain to provide voltage limiting. The limiting provides the benefits of reducing any amplitude modulation or noise on the signal and establishing a fixed signal level to drive phase detector 405 of phase locked loop 403. Differential amplifier 402 has a high input impedance such that connection of multiple music receivers (MR1 and MR2) will not load down common music transmitter MT1 or otherwise affect the operation of this music-on-hold distributing arrangement. Loading effects are also diminished because of the low output impedance of music transmitter MT1. In addition, the unilateral operation of differential amplifier 402 prevents signal flow from its output to its input. Thus, the possibility of cross-coupling of voice signals between line 1 and line 2, shown in FIG. 1, during pauses in the music transmission is virtually nonexistent. In addition, a failure of music source MS1, shown in FIG. 1, will not present a cross-coupling problem since music receivers MR1 and MR2 will isolate lines 1 and 2.

Phase-locked loop 403 of FIG. 4 can be constructed using any of a number of commercially available units. The Signetics NE565 phase-locked loop is typical of the devices available and could be connected as shown in block 403 to provide the phase-loop function. The frequency of oscillation of voltage controlled oscillator 406 is given approximately by $$f_R \approx \frac{1.2}{4R_fC_f} \qquad (2)$$

where $R_f$ is the value of resistor 4R10 and $C_f$ is the value of capacitor 4C4. The frequency $f_R$, of course, should be the same as center frequency $f_o$ of VCO 303 of music transmitter MT1 shown in FIG. 3 and described by equation (1).

The output of differential amplifier 402 is connected, via capacitor 4C1, to input X of phase detector 405. Phase detector 405 has a differential input and resistors 4R8 and 4R9 are of such value as to present an equal driving impedance to input terminals X and Y. VCO 406 is connected to phase detector 405 as shown by jumper J. The output of phase detector 405 connects to amplifier 407 whose output connects to a low pass filter comprised of internal resistor 408 and capacitor 4C3. This low pass filter is used to eliminate unwanted frequencies from the demodulated output Z of phase-locked loop 403. Output Z is connected to output amplifier 404. A more detailed description of the operation of phase-locked loops is available in the Signetics digital, linear MOS applications handbook, 1974 edition.

When phase-locked loop 403 is locked to the incoming signal the demodulated output Z is the desired music signal. This music signal is amplified by output amplifier 404 comprised of integrated circuit amplifier 409 and associated resistors 4R11, 4R12 and capacitors 4C7 and 4C8. The frequency response of output amplifier 404 as determined by components 4R11, 4R12, 4C7 and 4C8 provides gain only for the desired music signal. The output of amplifier 404 is connected through the primary of transformer 4T1 and capacitor 4C9 to ground. Transformer 4T1 isolates music receiver MR1 from the telephone (central office) and applies the music signal across this telephone line such as to maintain the longitudinal balance of the line. One terminal of the secondary of transformer 4T1 is connected in series with resistor 4R12 and terminates on pin 1 of option socket 400. The second terminal of the secondary of transformer 4T1 is connected to pin 6 of the option socket 400. As shown by FIG. 2, pin 1 and 6 of the mating option plug OPN are connected across hold resistor 2R1. Hence, the music signal is connected across the telephone pairs, R (CO), T (CO) and R (station), T (station), when make contact 2H-1 is closed during a hold condition.

The design of music receiver MR1 could be implemented using a variety of electronic circuits well known in the electronics art. Music transmitter MT1 and music receiver MR1 could be designed using amplitude modulation (AM) techniques but the switching noise present on key system leads would produce significant audio noise levels when demodulated by an AM detector. Thus, to obtain equal signal quality (signal-to-noise performance) using AM transmission would require a higher signal transmission level than required for a comparable FM system. Also in an FM system the demodulated signal level is independent of the RF loss of the transmission path and so does not require an automatic gain control in the receiver as required in an AM system. Thus, in an FM system a failure of music source MS1 will result in normal line noise rather than a greatly increased noise level as with an AM system with an AGC circuit. In addition, additional audible interference could occur when AM signals are demodulated by any device nonlinearity.

Thus, although FM is not the most efficient system for overcoming noise, it is one of the easiest methods with which to implement our music transmitter MT1 and receiver MR1 units.

Other Music Receiver Arrangements

Figure 7:
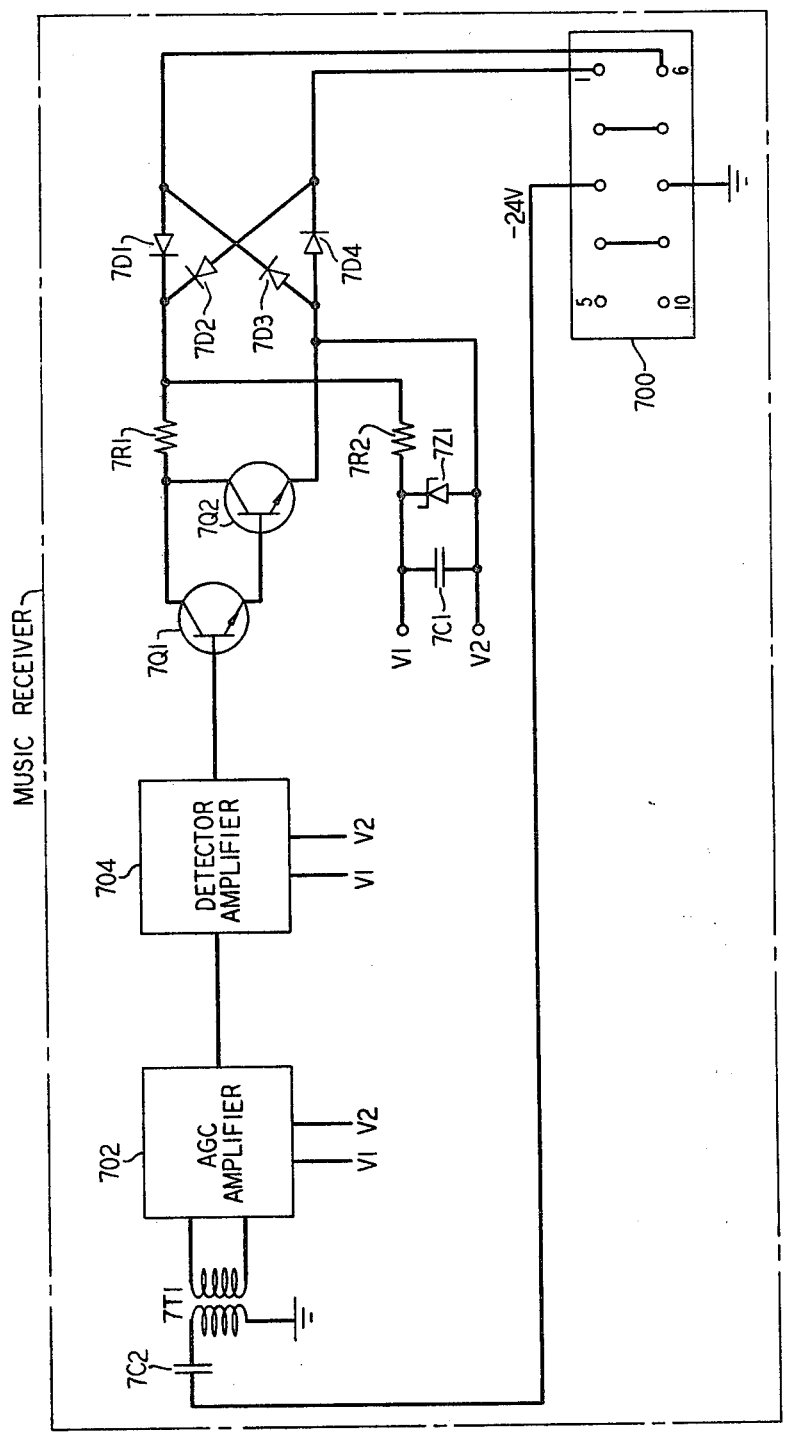
FIG. 7 shows a schematic of a line powered music receiver circuit.

Other innovations which could be made in music receiver MR1 is to power the unit from the telephone line as shown in FIG. 7. The circuit of FIG. 7 is an AM type system and requires elimination of hold resistor 2R1 of FIG. 2. Thus, dc current from the telephone line flows from pin 6 of option socket 700 through diode 7D1, resistor 7R1, transistors 7Q1 and 7Q2 and diode 7D4 back to the telephone line via pin 1 of option socket 700. These components provide a hold impedance during the hold mode. The diodes 7D1, 7D2, 7D3 and 7D4 provide a polarity guard enabling powering during voltage polarity reversals on the telephone line. Resistor 7R2, capacitor 7C1 and zener diode 7Z1 provide a power supply voltage for powering the automatic gain control (AGC) amplifier 702, and amplifier detector 704. Note that transformer isolation (7T1) occurs at the input with the line powered music receiver whereas in FIG. 4 transformer coupling (4T1) was at the output of the music receiver MT1. Capacitor 7C2 prevents dc current flow through transformer 7T1. Transformer 7T1 could be eliminated and replaced by a conventional RF coupling circuit at a sacrifice of signal balance.

Because of the limited voltage available across terminals V1 and V2, circuits 702 and 704 were required which would operate at voltages of approximately 1.5 volts. Because of the limited voltage available an FM type system may not be functional with existing integrated circuits but a working AM type system of the type shown in FIG. 7 was made operational using a Ferranti ZN-414 integrated circuit as the AGC amplifier 702. The Zn-414 provides RF gain, AM detection and limited AGC capability and is connected in a conventional manner described in its data sheet. Such a line powered music receiver would nicely complement a line powered line circuit and music transmitter to provide music-on-hold at key telephone locations where no outside power is available. Note, a switch could be added to the music receiver to optionally disable the music feature while maintaining the operation of the music receiver as a hold impedance.

The music transmitter (MT1) of FIG. 3 and music receiver (MR1) of FIG. 4 could be designed for radio transmission and reception of music signals. This transmission within the key systems by radio eliminates the need to share existing cables, but may present additional problems. To insure adequate received signal-to-noise ratios a high field strength signal may have to be transmitted. The presence of large RF field strengths may require radio frequency interference (RFI) protection of the surrounding equipment to insure proper telephone operation. The application of a music-on-hold capability for key telephone systems using radio transmission for distributing the music signal may be practical in key systems where the rewiring or the sharing of existing leads is not possible. In addition, such a system may offer some advantages of isolation or ease of multiplexing when multiple different music sources need be distributed to multiple line circuits. For example, multiple transmitters utilizing different carrier frequencies to convey different music signals can more easily share the air waves than a wired facility.

While the embodiment discussed comprised one music transmitter unit and one music receiver unit, the invention is not confined to such limited use but can be used with any number of music transmitter or receiver units. In addition, as shown in FIG. 1, the system can function with any distribution of music receivers and/or option sockets together in a key telephone line circuit panel.

It is obvious that the invention disclosed need not be provided on an option basis but could be incorporated in the design of the key telephone line units. In addition, the music signal can be switched across the hold resistor rather than constantly being applied across the hold resistor.

Although the music distribution system utilized analog modulation techniques the invention does not preclude the use of either an analog carrier with a digital representation of the music signal or an all digital system. In addition, transmission techniques such as time or frequency multiplexing could be used to facilitate the distribution of multiple different music signals to multiple line circuits. The invention is not limited in scope to the transmission of music or entertainment signals, but could be used for the distribution of any analog or digital signals whether it be voice, video, data or combinations thereof. The invention enables the application of carrier technology to the distribution of signals within the key telephone systems.

Although specific embodiments of the music transmitter and receiver have been disclosed, other embodiments known to those skilled in the art could provide the same function without deviating from the scope of my invention.

Self-exciting Tone-on-hold arrangements

Figure 8:
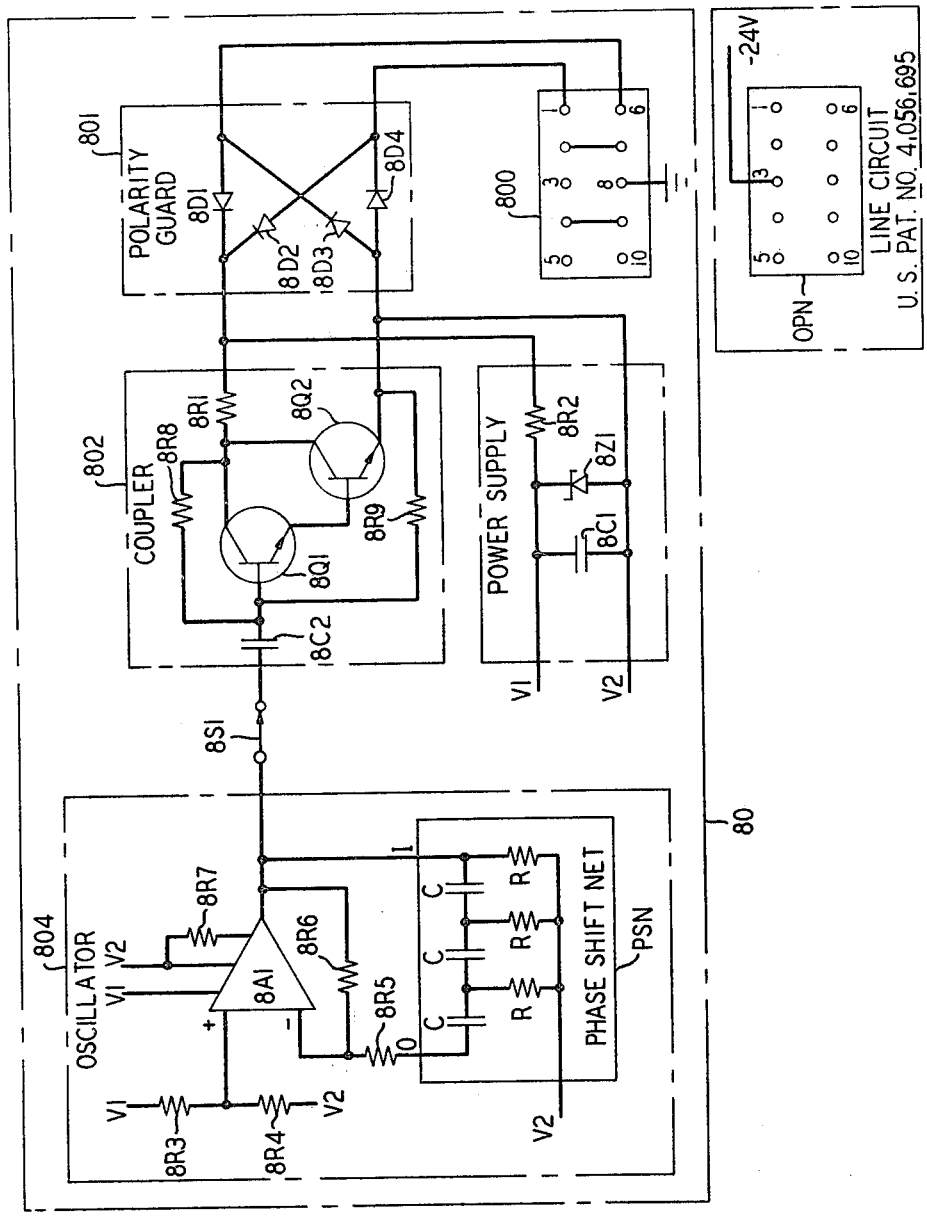
FIG. 8 shows a schematic of a tone generating hold impedance.
Figure 11:
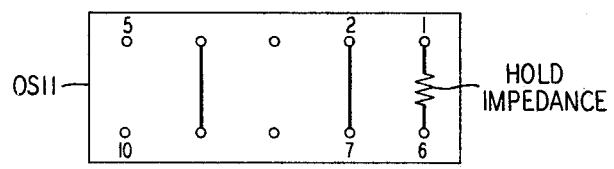
FIG. 11 shows an option socket with a built in hold resistor.

Shown in FIG. 8 is tone generating hold impedance 80 which connects via a option connector 800 to the line circuit (U.S. Pat. No. 4,056,695) as shown in FIG. 1. It is noted that line powered tone generating hold impedance 80 of FIG. 8 does not utilize the −24 V dc supply voltage available at Pin 3 of option connector 800. Since tone generating hold impedance 80 does not connect to the −24 V terminal of option connector 800 any FM signal present on the −24 V terminal will not effect the tone applied to a line on hold by tone generating hold impedance 80. Thus, in an arrangement as shown in FIG. 1 it is possible that a line circuit could have a line powered music-on-hold capability (utilizing the music receiver circuit of FIG. 7) or a line powered tone-on-hold capability (utilizing tone generating hold impedance 80 of FIG. 8) or neither (utilizing option socket OS11 of FIG. 11) depending on the option card used. Each of the above line powered arrangements require that hold resistor 2R1 (FIG. 2) be removed from each line circuit.

Returning to tone generating hold impedance 80 of FIG. 8 we note that dc current from the telephone line flows from pin 6 of option socket 800 through diode 8D1, resistor 8R1, transistors 8Q1 and 8Q2 and diode 8D4 back to the telephone line via pin 1 of option socket 800. Resistors 8R8 and 8R9 provides bias to transistor 8Q1. These components basically provide the line hold impedance and provide a method of coupling signals to the line on hold. Resistor 8R1 is chosen so that the impedance of the tone generating hold impedance is the same as the conventional hold resistor. The diodes 8D1, 8D2, 8D3, and 8D4 provide a polarity guard enabling powering during voltage polarity reversals on the telephone line. Resistor 8R2, capacitor 8C1 and zener diode 8Z1 provide a power supply voltage (V1-V2) for powering amplifier 8A1. The current drain of the power supply must be considered in determining the impedance that the tone generating hold impedance is to provide to the line.

Because of the limited power supply voltage (V1-V2) available amplifier 8A1 is a low power operational amplifier such as RCA CA 3078 which will operate on 1.5 volts. The data sheet of the RCA CA 3078, which is incorporated herein by reference, indicates that bias resistor 8R7 determines the quiescent operating current of amplifier 8A1. Resistor 8R3 and 8R4 bias the positive input terminal of amplifier 8A1 midway between V1 and V2. The ratio of resistor 8R6 to resistor 8R5 will determine the gain of amplifier 8A1. The gain of amplifier 8A1 is set so that the loop gain through amplifier 8A1 and phase shift network (PSN) will be at least 1 at the oscillating frequency. The connection of the output of amplifier 8A1 to the PSN input (I) and the connection of PSN output (O) to the inverting input of amplifier 8A1 provides an oscillator circuit 804. This oscillator circuit is one of the simplest to design and construct at low frequencies and is described in *Electronic Circuits: Discrete and Integrated*, by Shilling and Belove, McGraw Hill, 1968 at page 609. The PSN network can be a three-stage R-C ladder network as shown which will provide the additional 180° phase shift at $$f_o = \frac{1}{2\pi \sqrt{3} RC}.$$

The frequency $f_o$ is selected to provide a constant pleasing audio tone to the customer on hold.

Switch 8S1 allows the disconnecting of the tone output to capacitor 8C2 of output coupler 802. With switch 8S1 open resistors 8R8 and 8R9 continue to bias transistor 8Q1 thus maintaining the hold impedance presented across terminals 1 and 6 of option socket 800.

In certain applications an interrupted tone or an alternating tone may be more pleasing than a constant tone to a customer on hold. The circuit of FIG. 9 describes a tone generating hold impedance which contains an interrupter circuit which periodically interrupts the tone supplied to the customer on hold. The circuit of FIG. 10 describes a tone generating hold impedance which contains two tone sources which are alternately applied to the customer on hold.

Figure 9:
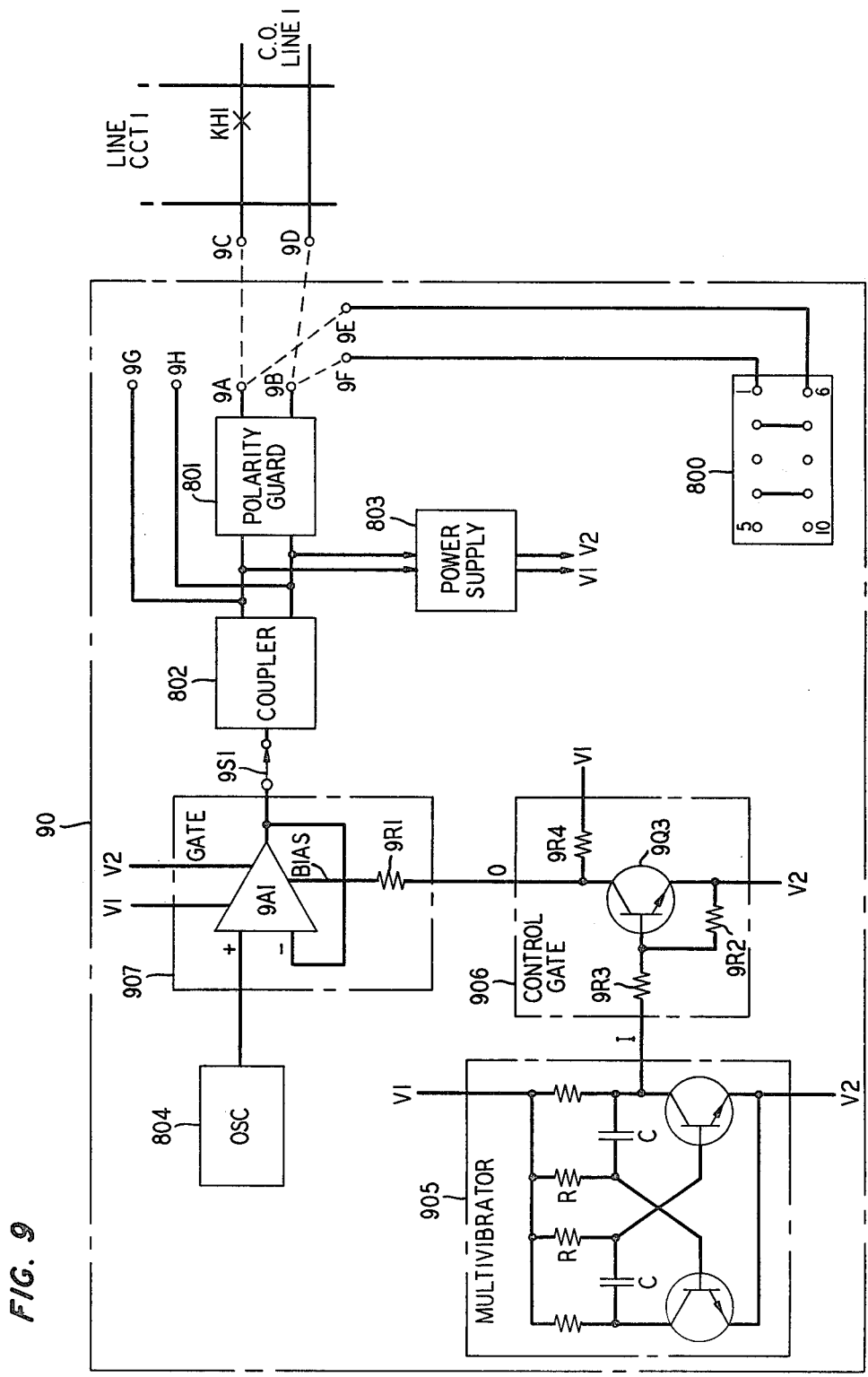
FIG. 9 shows a schematic of a tone generating hold impedance having an interrupted tone output.

In FIG. 9, polarity guard 801, coupler 802 and power supply 803 are the same circuits as shown in FIG. 8 and function in the same manner. Tone generating hold impedance circuit 90 can be implemented as an option card if terminals 9A and 9B are connected to terminals 9E and 9F. As an option card tone generating hold impedance 90 would connect to line circuits in the same manner as does music receiver MR1 as shown in FIG. 1.

Figure 12:
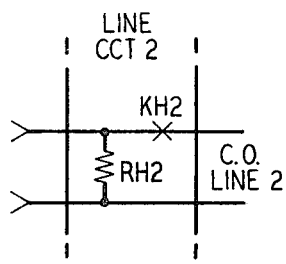
FIG. 12 shows a schematic of a simplified line circuit.

Tone generating hold impedance 90 can also be implemented as a circuit having two external terminals 9A and 9B. These terminals 9A and 9B could then connect to terminals 9C and 9D of line circuit 1 of FIG. 9 replacing the hold resistor of line circuit 1. The typical hold operation is shown by simplified line circuit 2 of FIG. 12. When a customer places central office (CO) line 2 in the hold condition resistor RH2 is switched across CO line 2 by make contact KH2. Note that when a tone-on-hold capability is required, tone generating hold impedance 90 is connected to terminals 9C and 9D of line circuit 1 and the corresponding hold resistor of that line circuit is removed. Thus, when a customer places CO line 1 on hold the make contact KH1 will switch tone generating hold impedance 90 across the CO line 1. Tone generating hold impedance 90 will provide the impedance necessary to hold CO line 1 and provide a periodically interrupted tone to CO line 1.

Thus, the disclosed tone generating hold impedance is not limited to line circuit cards with an option connector but can replace the existing hold resistors in other types of line circuits. If the tone generating hold impedance is implemented as an integrated or hybrid integrated circuit such a substitution for a hold resistor may be easily accomplished. If the tone generating hold impedance is implemented as a small printed circuit card with terminals 9A and 9B as external terminals then, depending on its physical size, it may replace the hold resistor in line circuits where space is available.

The generation of the interrupted tone occurs by the intermittent gating of a constant tone source. In FIG. 9 oscillator 804 functions identical to oscillator 804 to FIG. 8 to provide a constant audio tone. Gate 907 consists of the same low power operational amplifier RCA CA 3078 as is used in oscillator 804. Amplifier 9A1 contains a bias terminal which controls the output of the amplifier. The appreciation of V2 (the effective ground voltage of the tone generating hold impedance circuit) to the bias terminal will cut off amplifier 9A while application of V1 will allow the tone to pass through. Note that signal gain, if desired, could be added as described in the data sheet of the RCA CA 3078. Resistor 9R1 is selected to control the bias current to amplifier 9A1. Control gate 906 is an inverting gate consisting of base bias resistors 9R2 and 9R3 transistor 9Q3 and collector load resistor 9R4. When the input I voltage to control gate 906 is at V2 the output 0 of control gate 906 is at V1 turning on gate 907 allowing the tone from oscillator 804 through to output coupler 802. When the input I voltage to control gate is V2 its output is V1 and hence gate 907 blocks oscillator 904 output.

Multivibrator 905 is a standard type as described in *Pulse Digital and Switching Waveforms*, Millman and Taub, McGraw Hill (1965) at page 438, which is incorporated by reference herein. The frequency of operation is $$f_o = \frac{1}{2(.69)RC} \qquad (3)$$

where R is the base bias resistor and C is the coupling capacitor. Note the duty cycle of multivibrator 905 can be set at any desirable ratio by appropriate changes in the relative values of the base resistors and coupling capacitors. The output of multivibrator 905 switches between V2 and V1 at the $f_o$ rate and drives control gate 906. Thus oscillator 804 has its output tone interrupted by gate 907 which is driven by control gate 906 at a rate set by multivibrator 905. Switch 9S1 is used to disable the tone-on-hold signals without affecting the holding impedance presented to the central office line.

Figure 10:
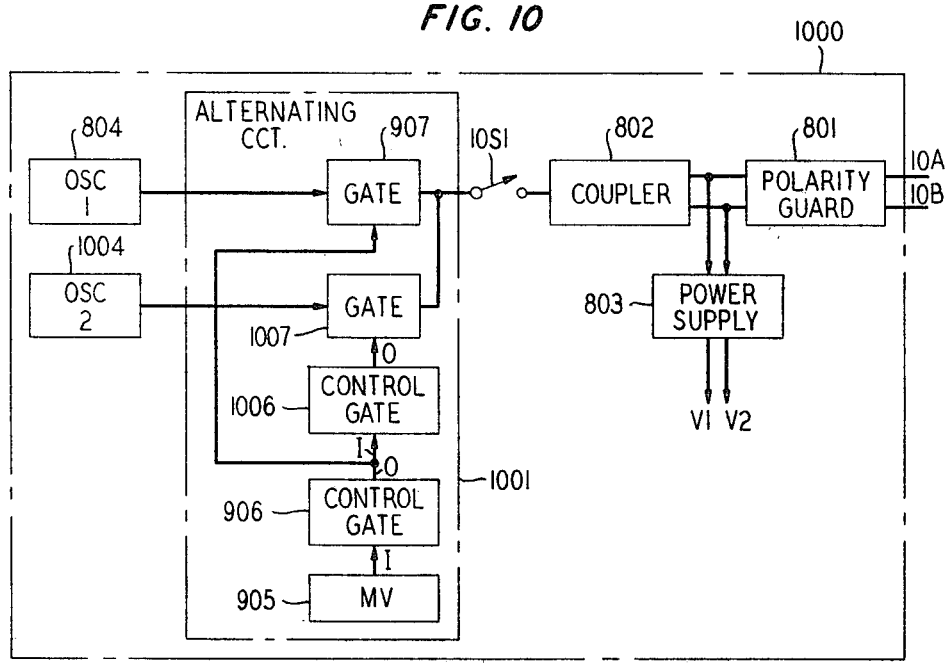
FIG. 10 shows a schematic of a tone generating hold impedance having two tones that are alternatively applied to a line on hold.

When it is desirable to supply alternating different audio tones to the customer on hold tone generating hold impedance 1000 as shown in FIG. 10 can be used. Tone generating hold impedance 1000 consists of two oscillators 804 and 1004 which are applied through alternating circuit 1001 which alternately applies each audio tone to the central office line on hold. The circuit shown in FIG. 10 is in block form, the description of the function of each block being the same as the description of the corresponding block of FIG. 8 and FIG. 9. Thus, oscillator 804 of FIG. 10 is identical to oscillator 804 of FIG. 8. In addition, gate 1007 is identical to gate 907 and control gate 1006 is identical to control gate 906.

Oscillator 1004 is identical with oscillator 804 except that the value of resistor R and capacitor C of the phase shift network are different resulting in an oscillating frequency which is different than the frequency of oscillation of oscillator 804.

The operation of alternating circuit 1001 of FIG. 10 is as follows. When the output of multivibrator 905 is at V2 the output 0 of control gate 906 is at V1 which biases gate 907 off. The output 0 of control gate 906 connects to input I of control gate 1006 and hence the output of control gate 1006 will be at V2 turning on gate 1007 and allowing the tone from oscillator 1004 to be gated to output coupler 802 and hence across terminals 10A and 10B.

When the output of multivibrator 905 is at V1 then the output 0 of control gate 906 is at V2, thus turning on gate 907 allowing the signal from oscillator 804 to pass to output coupler 802. Since the input I to control gate 1006 is at V2 the output of control gate 1006 is at V1 biasing gate 107 off. Thus, as multivibrator 905 output switches between V1 and V2, every few seconds, the audio tones from oscillators 804 and 1004 are alternately applied to the central office line on hold. As noted before the frequency and duty cycle of multivibrator 905 as well as the frequencies of oscillators 804 and 104 can be set to suit particular preferences or applications.

Power supply 803 supplies voltage V1 and V2 to all the units of FIG. 10. Switch 10S1 is used to disable the tone-on-hold signal to the central office line.

Other Tone-on-hold Arrangements

It is obvious that the oscillator 804 of FIGS. 8, 9, 10 and oscillator 1004 of FIG. 10 are merely illustrative of any signal producing means which could produce the desired audio tone. Likewise, the interrupter circuit depicted by multivibrator 905, control gate 906 and gate 907 of FIG. 9 could be implemented more generally as a tone amplitude modulator (not illustrated) which could vary the tone level between desired limits to produce a warbling tone. In addition, the multivibrator 905 or tone modulator could be implemented external to tone generating hold impedance 90, for instance it could be part of key telephone line circuit design. The modulated tone outputted to the party on hold could also be coded to convey information regarding the status of the hold condition.

If desirable, tone generating hold impedance 1000 of FIG. 10 could provide multiple tones simultaneously to the line. Such a circuit (not illustrated) would have the output of oscillator 804 and 1004 of FIG. 10 connected directly through switch 10S1 to coupler 802, alternating circuit 1001 being omitted from the circuit. Thus, both of the outputs of oscillators 804 and 1004 would be applied across terminals 10A and 10B when the line is placed on hold. Obviously, many other variations of tones or methods of application can be devised without deviating from the scope of my invention.

The invention disclosed need not only be provided as an option or as a substitution for a hold resistor but can be incorporated into the design of the key telephone line units. Thus, for example, with reference to FIG. 9 polarity guard 801 and power supply 803 could be shared with other circuits of the line unit and the output of coupler 802 at terminals 9G and 9H connected as the hold impedance. Thus, if oscillator 804 and multivibrator 905 have a low enough current drain so as not to maintain an active line they can be connected to operate as soon as there is voltage on the c.o. line (off hook condition). Hence, when the hold condition is established, there will be no start up delays in the operation of oscillator 804 or multivibrator 905.

Although specific embodiments of the tone generating hold impedance have been disclosed, other embodiments known to those skilled in the art could provide the same function without deviating from the scope of my invention.

What is claimed is:

1. A two-terminal audio generating hold impedance circuit for use in a key telephone line circuit, said impedance circuit adapted for placing a connected telephone line in an active noncommunicating mode when switched across an associated telephone line in response to a hold request from a connected telephone station, said two-terminal hold impedance circuit comprising:

audio signal producing means self-exciting from dc voltages on said telephone line when said impedance circuit is switched across said telephone line, and means for coupling said produced audio signal to said telephone line while allowing sufficient dc current flow through said impedance circuit to place an associated telephone line in the active noncommunicating mode.

2. The invention of claim 1 including switching means manually operable for preventing the audio output of said audio signal producing means from being connected to said coupling means.

3. The invention of claim 1 wherein said audio signal producing means is an audio oscillator.

4. The invention of claim 1 including means for controlling the amplitude of the output of said audio producing means applied to said coupling means.

5. The invention of claim 4 wherein said amplitude controlling means is a periodic interrupting circuit.

6. A two-terminal audio generating hold impedance circuit for use in a key telephone line circuit, said impedance circuit adapted for placing a connected telephone line in an active noncommunicating mode when switched across an associated telephone line in response to a hold request from a connected telephone station, said two-terminal hold impedance comprising:
   first audio signal producing means self-exciting from dc voltages on said telephone line when said first audio signal producing means is switched across said telephone line,
   second audio signal producing means self-exciting from dc voltages on said telephone line when said second audio signal producing means is switched across said telephone lines,
   means for alternately selecting the audio signals of said first and said second audio signal producing means, and
   means for coupling said alternately selected audio signals to said telephone line while allowing sufficient dc current flow through said impedance circuit to place an associated telephone in the active noncommunicating mode.

7. The invention of claim 6 including switching means manually operable for disabling the audio output from said alternate selecting means from being connected to said coupling means.

8. The invention of claim 6 wherein said first and second audio signal producing means are audio plural.

9. A line circuit for use in a key telephone system, said line circuit adapted for connection between a subscriber station and a telephone line from a switching network, said line circuit being adapted for providing loop current flow and an audio tone signal on said line in response to a subscriber request to place said associated subscriber station in the active noncommunicating mode, said line circuit comprising:
   audio generating hold impedance means
   means for switching said holding impedance means across said telephone line to establish said active noncommunicating mode,
   said impedance means including
   audio signal producing means self-exciting from dc voltages applied when said impedance means is switched across said telephone line, and
   means for coupling said produced audio signal to said telephone line while allowing sufficient dc current flow through said impedance means to establish said active noncommunicating mode.

10. The invention of claim 9 including means for controlling the output of the output of said audio signal producing means applied to said coupling means.

11. The invention of claim 10 wherein said amplitude controlling means is a periodic interrupting circuit.

12. The invention of claim 9 wherein said audio signal producing means includes a first and a second audio signal generating means and including means for alternately applying the output of said first and second audio signal generating means to said coupling means.

13. The invention of claim 12 wherein said first and second audio signal generating means are audio oscillators.

14. A signal distributing arrangement for providing information signals to selected key telephone line circuits when in the active noncommunicating mode, said distributing arrangement comprising:
   transmitter means common to said line circuits for encoding information signals onto a carrier signal resulting in an encoded carrier signal,
   means for distributing said encoded carrier signal to each said line circuit,
   a receiver circuit associated with each said selected line circuit said receiver circuit comprising,
   means for isolating said encoded carrier signal from other signals on said distributing means,
   means for decoding said encoded carrier signal to obtain said information signals,
   means for applying said information signals to a central office telephone line connected to said associated line circuit, and
   wherein said receiver circuit provides the hold impedance for said line circuit.

15. A line circuit for use in a key telephone system, said line circuit adapted for connection between a subscriber station and a telephone line from a switching network, and adapted for providing loop current flow and information signal on said line when said associated subscriber station is in the active noncommunicating mode, said information signal being received as a modulated radio frequency carrier signal, said line circuit comprising:
   means for isolating said received modulated radio frequency carrier signal from received other signals,
   means for demodulating said isolated radio frequency carrier signal to obtain a resultant information signal,
   means for amplifying said resultant information signal,
   means for applying said amplified information signal across said telephone line from said switching network associated with said line circuit, and
   wherein said line circuit includes means for providing the hold impedance for said line circuit.

16. A line circuit for use in a key telephone system, said line circuit adapted for connection between a subscriber station and a telephone line from a switching network, and adapted for providing loop current flow and an information signal on said line when said associated subscriber station is in the active noncommunicating mode, said information signal being received as a modulated radio frequency carrier signal, said line circuit comprising:
   means for isolating said received modulated radio frequency carrier signal from received other signals,
   means for demodulating said isolated radio frequency carrier signal to obtain a resultant information signal,
   means for amplifying said resultant information signal,
   means for applying said amplified information signal across said telephone line from said switching network associated with said line circuit, wherein said applying means includes means for connecting said information signals in a balanced mode to the line associated with said line circuit, and wherein said applying means provides the hold impedance for said line circuit.

17. A receiver circuit adapted for use with a key telephone line circuit for providing information signals to said line circuit when said line circuit is in the active noncommunicating mode, said receiver circuit comprising:

means for connection to a communication pair from a switching network said communication pair associated with said key telephone line circuit, means for isolating an encoded carrier signal from received other signals, means for decoding said encoded carrier signal into an information signal, means for applying said information signal to said communication pair associated with said line circuit, wherein said connection means includes means for connecting said information signal in a balanced mode to said line circuit, wherein said connection means includes means for connecting said information signals in parallel with the hold impedance of said line circuit, and wherein said receiver circuit provides the hold impedance for said line circuit.

* * * * *

UNITED STATES PATENT AND TRADEMARK OFFICE
CERTIFICATE OF CORRECTION

PATENT NO. : 4,219,701
DATED : August 26, 1980
INVENTOR(S) : Alexander Feiner

It is certified that error appears in the above-identified patent and that said Letters Patent are hereby corrected as shown below:

In Claim 8, Column 13, line 40 "plural" should be --oscillators--.

Signed and Sealed this

Twenty-fifth Day of November 1980

[SEAL]

Attest:

SIDNEY A. DIAMOND

Attesting Officer

Commissioner of Patents and Trademarks